July 12, 1927. 1,635,769
V. ROYLE
CHIP PAN FOR ROUTING MACHINES
Filed Jan. 25, 1922
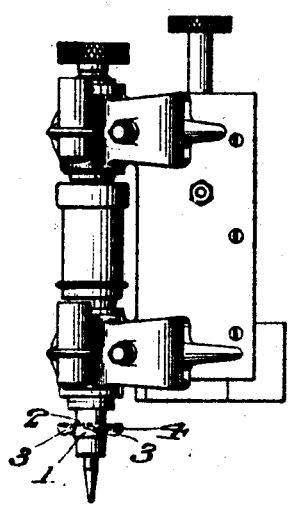
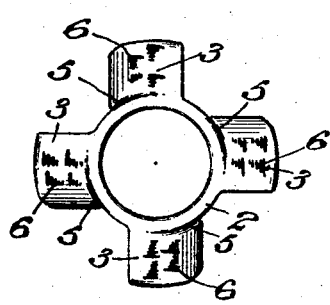
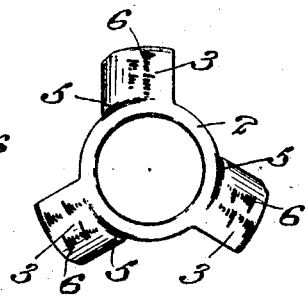
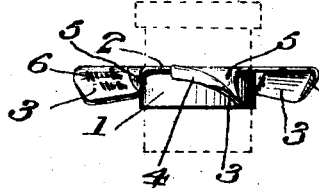
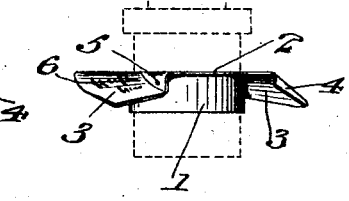
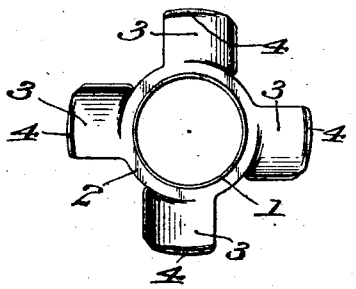
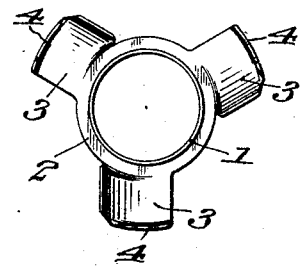
Inventor
Vernon Royle
By his Attorneys Patented July 12, 1927.

1,635,769

UNITED STATES PATENT OFFICE.

VERNON ROYLE, OF PATERSON, NEW JERSEY.

CHIP FAN FOR ROUTING MACHINES.

Application filed January 25, 1922. Serial No. 531,798.

This invention relates to an improvement in chip fans for routing machines and has for an object to provide such a device which is cheap to manufacture and yet perfectly balanced.

Another object consists in providing such a device which may be readily secured in position without the employment of screws or the like.

A further object consists in providing such a device which is very light and yet durable and efficient in operation.

A still further object consists in providing certain improvements in the form, construction and arrangement of the different elements of the device whereby the above named and other objects may be effectively attained.

In the use of routing machines, the operator is generally following some course which it is necessary for him to have in view at all times so that he may properly guide the tool. Naturally, the routing operation generates an accumulation of chips or shavings which must be removed concurrently with the operation of the tool, if the workman is to have an unobstructed view of the work. Furthermore, this accumulation of chips or shavings should be removed as the device is operating, in order to prevent the same from working under the tool and, possibly, hindering its perfect operation.

In order to accomplish this object, it has been common to provide the spindle of the routing machine head which carries the tool, with fan blades so arranged as to give rise to a downward current of air during the rotation of the tool. These blades have commonly been made separately and provided with shanks threaded into the spindle of the routing machine head. This operation has been somewhat expensive and has always been subject to the liability of the several blades being set at a slightly different angle to the axis of the tool, being of slightly different shape or surface smoothness, being slightly different in weight, and having a slightly different contact with the exterior surface of the spindle. Any one of these variations tends to give rise to a humming sound, which is annoying, and to vibration of the tool, which hinders its perfect operation. In contemplation of these disadvantages, I have made the invention which is the subject matter of the present application.

A practical embodiment of my invention is represented in the accompanying drawings, in which Fig. 1 represents a side elevation of an improved form of router head with my fan in position thereon.

Fig. 2 represents a top plan view of a four blade fan embodying my invention.

Fig. 3 represents a side elevation of the same, with a portion of the spindle shown in dotted lines.

Fig. 4 represents a bottom plan view of the same.

Figs. 5, 6 and 7 correspond with Figs. 2, 3 and 4, respectively, except that a three blade fan is shown.

In producing my improved fan, suitable sheet material, such as steel, is selected, and is subjected to a stamping operation, effected in a well-known manner by the use of suitable dies, which operation completely forms the fan.

The fan consists of a collar 1 which is of such size as to have a sliding fit upon the exterior of a standard size of routing machine spindle. This collar is preferably arranged so as to be of slightly less interior diameter at one edge than at the other, so that it will frictionally grip the exterior of the spindle as it is forced upwardly thereon in order to firmly hold the fan in position, as shown in Fig. 1; and I prefer to make the slightly larger diameter at the edge from which the blades project. However, the elasticity of the sheet metal from which the fan is stamped, is adequate to hold it in position even though the bore of the collar be of equal diameter throughout, by arranging that the said bore shall be of the same diameter as the exterior of the spindle to which it is intended to be applied, the assembly being made by the usual driving fit operation.

At one edge of the collar, preferably at the upper portion, a flange 2 projects laterally therefrom for a slight distance. This flange is integral with the collar and is formed by the stamping operation already mentioned. At equidistant points the periphery of the flange 2 is developed into fan blades 3, which are also integral with the device and formed by the stamping operation. As already indicated, there are four of these blades in the form shown in Figs. 1 to 4 inclusive, while only three blades are shown in the modified form shown in Figs. 5 to 7 inclusive.

These blades are preferably curved in transverse cross section, and have their outer edges turned downwardly, as represented at 4, in order that they may more effectually trap air and force it down along the sides of the tool to disperse the accumulation of débris. Furthermore, it will be noted that the blades 4, in spite of their transverse curvature, are integral with the flange 2 throughout their entire width. This is effected by causing the stamping operation which curves the blades to leave a web 5 connecting that part of each blade which is curved out of the plane of the flange 2, with the said flange. This greatly increases the strength, rigidity and durability of the device.

As already indicated, Fig. 1 represents the device in position on the head of a routing machine but, as the said head may be of any well-known or approved form, I will not describe the same herein.

From the foregoing, it will be observed that my improved fan may be manufactured from standard material by the employment of a simple and well-known stamping operation using dies which are perfectly accurate. Therefore, the result is the production of such an article which is always uniform in shape, size, balance and surface, so as to always accurately fit and operate without entailing any of the disadvantages heretofore experienced. Further, this device may be so cheaply made as to be sold for less than the actual cost of a single one of the separate blades heretofore commonly employed.

I have also found that this fan lends itself readily to the inscription of advertising matter or legends which may appropriately apply to the tool in connection with which the fan is intended to be employed. The blades not only provide space for suitable inscriptions, as indicated at 6 in Figs. 2 and 3, but the stamping operation which forms the blades can also be used for imparting the inscriptions thereto.

I desire it to be understood that various changes may be resorted to in the form, arrangement, composition and method of producing the device without departing from the spirit and scope of my invention; and hence I do not intend to be limited to the details herein shown and described, except as they may be included in the claims.

What I claim is:

1. An article of the character described comprising, a collar, a lateral flange developed from one edge of the collar, and blades projecting from the flange, said blades having their outer edges bent downwardly.

2. An article of the character described comprising, a collar, a lateral flange developed from one edge of the collar, and blades projecting from the flange, said blades being curved in cross section and having their outer edges bent downwardly.

3. An article of the character described comprising, a collar, a lateral flange developed from one edge of the collar, and blades developed and projecting from the flange, said collar being of less diameter at one edge than at the other.

4. An article of the character described comprising, a collar having an annular flange developed laterally from one edge thereof, and blades projecting from and connected with said flange throughout substantially their entire width.

5. An article of the character described comprising, a collar having an annular flange developed laterally from one edge thereof, blades projecting from said flange, a portion of each blade lying in a different parallel plane from the plane of the flange, and a web connecting the said portion with the said flange.

6. An article of the character described comprising, a collar having an annular flange developed laterally from one edge thereof, blades projecting from the periphery of the flange, a portion of each blade extending away from said flange toward the opposite edge of the collar, and a web lying in a plane substantially parallel to the axis of the collar and connecting the said portion with the periphery of the said flange.

In testimony that I claim the foregoing as my invention, I have signed my name this 18th day of January, 1922.

VERNON ROYLE.